United States Patent [19]

Hirose et al.

[11] Patent Number: 4,593,068

[45] Date of Patent: Jun. 3, 1986

[54] CURING COMPOSITION CONTAINING POLYETHER HAVING REACTIVE SILICON-CONTAINING GROUP AND A (METH)ACRYLATE POLYMER

[75] Inventors: Toshifumi Hirose; Katsuhiko Isayama, both of Kobe, Japan

[73] Assignee: Kanegafushi Kagaku Kogyo Kabushiki Kaisha, Osaka, Japan

[21] Appl. No.: 542,995

[22] Filed: Oct. 18, 1983

[30] Foreign Application Priority Data

Oct. 20, 1982 [JP] Japan .................. 57-185277

[51] Int. Cl.$^4$ ................ C08L 33/08; C08L 33/10; C08L 71/02
[52] U.S. Cl. ................ 525/100; 428/447; 428/483; 524/506; 524/500; 525/101; 525/102; 525/404
[58] Field of Search .......... 525/100, 404, 101, 102

[56] References Cited

U.S. PATENT DOCUMENTS

| | | | |
|---|---|---|---|
| 3,644,245 | 2/1972 | Flanagan et al. | 525/101 |
| 4,147,685 | 4/1979 | Smith | 525/100 |
| 4,183,874 | 1/1980 | Fan et al. | 525/102 |
| 4,191,713 | 3/1980 | Yonezawa et al. | 525/100 |
| 4,302,571 | 11/1981 | Arai et al. | 525/404 |
| 4,352,917 | 10/1982 | Tripp | 525/479 |

Primary Examiner—Wilbert J. Briggs, Sr.
Attorney, Agent, or Firm—Antonelli, Terry & Wands

[57] ABSTRACT

A curing composition which comprises (A) a polyether having at least one reactive silicon-containing group in the molecule and (B) an acrylate polymer and/or an methacrylate polymer. The composition of the present invention has excellent weatherability, adhesive property, initial tackiness, especially at a low temperature, cohesive force, workability and stickness and is useful as a pressure sensitive adhesive, a sealing material, and the like.

7 Claims, No Drawings

CURING COMPOSITION CONTAINING POLYETHER HAVING REACTIVE SILICON-CONTAINING GROUP AND A (METH)ACRYLATE POLYMER

BACKGROUND OF THE INVENTION

The present invention relates to a curing composition, more particularly to a curing composition suitable for use in a pressure sensitive adhesive, a sealing material, and the like.

As conventional pressure sensitive adhesives there are usually used rubber adhesives obtained by using a natural rubber or a synthetic rubber as a main component and adding additives such as a tackifier, a softening agent and a filler, and acrylic resin adhesives obtained by using an acrylate as a main monomer and copolymerizing it with a polar monomer such as acrylic acid or vinyl acetate.

The preparation of the rubber adhesives, however, requires complicated procedures such as mastication of rubber chips, dissolution of the rubber and the other additives in a solvent for a long time. Also, the acrylic adhesives have insufficient cohesive force due to the problems with respect to degree of polymerization and distribution of molecular weight of an acrylic polymer. For improving cohesive force, various cross-linkable acrylic resin pressure sensitive adhesives are studied. As processes for preparing the cross-linkable acrylic resin adhesives, there are proposed a process in which a cross-linking agent such as a polyisocyanate compound, an epoxy compound, a polyamine compound, a phenol resin, a sulfur compound or an organometallic compound, and a process in which a polymerizable monomer having a hydrolyzable silicon-containing group is copolymerized with an acrylate polymer and the obtained copolymer is cross-linked with a silanol condensing catalyst. According to those processes, though the cohesive force of the acrylic resin adhesive can be improved, the preparation becomes difficult because an excess of cohesive force makes the initial thickness lower, especially at a low temperature, and the adjustment of the balance of the adhesive strength is not easy. Particularly in case of using an isocyanate compound as a cross-linking agent, it is necessary to consider not only its toxicity, but also secondary reactions.

The present inventors already proposed a curing composition containing as an effective component a specific polyether having a hydrolyzable silicon-containing group in Japanese Unexamined Patent Publication (Tokkyo Kokai) No. 56153/1980. It is also reported that the curing composition is useful as a pressure sensitive adhesives. The curing composition has a good tackiness at a low temperature and a good cohesive force, but has an insufficient adhesive strength. Therefore, in case that peeling strength is required, the adhesive strength of the curing composition is improved by adding a relatively large amount of a tackifier being compatible with the polyether to the curing composition. In such case, however, there are a problem that application workability is lowered due to increased viscosity of the composition, a problem that when the curing composition is applied on a backing such as a plastic film, the applied composition is easy to peel off from the backing because of bad stickness of the composition to the backing, and a problem that the curing composition is inferior in weather resistance resulting from the tackifier.

Polyethers having in the molecule at least one functional group such as a reactive silicon-containing group are disclosed, for instance, in Japanese Examined Patent Publication (Tokkyo Kokoku) No. 36319/1970, No. 12154/1971 and No. 32673/1974 and Japanese Unexamined Patent Publication No. 156599/1975, No. 73561/1976, No. 6096/1979, No. 13767/1980, No. 13768/1980, No. 82123/1980, No. 123620/1980, No. 125121/1980, No. 131021/1980, No. 131022/1980, No. 135135/1980 and No. 137129/1980. Though these polyethers provide cured materials having a high elongation, these polyethers have drawbacks resulting from the structure of the main chain. For instance, the polyether proposed in Japanese Unexamined Patent Publication No. 73561/1976 is poor in weather resistance because of having urethane bonds in the main chains. In the polyether having polypropylene oxide as a main chain, when an antioxidant is not used there is a problem in weather resistance since hydrogen atoms bonding to tertiary carbon atoms are easy to be oxidized.

It is an object of the present invention to provide a curing composition having excellent initial tackiness, adhesive property, cohesive force, weather resistance, application workability and stickness to a backing, and being useful particularly as a sealing material and a pressure sensitive adhesive.

These and other objects of the present invention will become apparent from the description hereinafter.

SUMMARY OF THE INVENTION

In accordance with the present invention, there is provided a curing composition which comprises (A) a polyether having at least one reactive silicon-containing group in the molecule, and (B) a polymer selected from the group consisting of an acrylate polymer, an methacrylate polymer and an admixture thereof.

The composition of the present invention has excellent weather resistance, adhesive property, initial tackiness especially at a low temperature, cohesive force, workability and stickness and is useful as a pressure sensitive adhesive, a sealing material, and the like.

DETAILED DESCRIPTION

It is necessary to employ as a component (A) a polyether having at least one reactive silicon-containing group in the molecule. The term "reactive silicon-containing group" as used herein means a silicon-containing group capable of condensing or reacting by or with moisture or an additive such as a condensation or a cross-linking agent, e.g. a hydrolyzable group bonding to silicon atom or silanol group. Representative examples of the reactive silicon-containing group are, for instance, a group of the general formula (1):

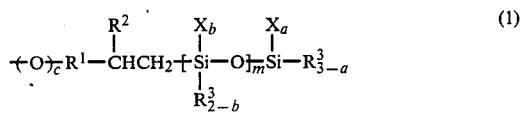

wherein $R^1$ is a bivalent organic group having 1 to 20 carbon atoms, $R^2$ is hydrogen or a monovalent organic group having 1 to 20 carbon atoms, $R^3$ is a monovalent hydrocarbon group or a triorganosiloxy group, "a" is 0, 1, 2 or 3, "b" is 0, 1 or 2, "c" is 0 or 1, provided that $1 \leq a+b \leq 4$, X is silanol group or a hydrolyzable group, and m is 0 or an integer of 1 to 18.

The polyether having such a silicon-containing functional group can be prepared, for instance, by addition reaction of a silicon hydride compound of the general formula (2):

wherein $R^3$, X, a, b and m are as defined above, and a polyether having an olefin group of the general formula (3):

wherein $R^1$, $R^2$ and c are as defined above, in the presence of a platinum compound as a catalyst, such as platinum black, chloroplatinic acid, a platinum alcohol compound, a platinum olefin complex, a platinum aldehyde complex or a platinum ketone complex.

In the above formula (1) or (2), $R^3$ is a monovalent hydrocarbon group, especially a monovalent hydrocarbon group having 1 to 20 carbon atoms, e.g. an alkyl group such as methyl or ethyl group, a cycloalkyl group such as cyclohexyl group, an aryl group such as phenyl group, and an aralkyl group such as benzyl group, and also includes a triorganosiloxy group of the general formula: $(R')_3SiO$— wherein R' is a monovalent hydrocarbon group having 1 to 20 carbon atoms and the groups R' may be the same or different. The hydrocarbon groups $R^3$ contained in the silicon hydride compound (2) may be the same or different. Also, the group X in the above formula (1) or (2) is silanol group or a hydrolyzable group such as a halogen, hydrogen, an alkoxy group, an acyloxy group, a ketoxymate group, amino group, amido group, aminoxy group, mercapto group and an alkenyloxy group. The hydrolyzable groups contained in the silicon hydride compound (2) may be the same or different.

Typical examples of the silicon hydride compound (2) are, for instance, a halogenated silane such as trichlorosilane, methyldichlorosilane, dimethylchlorosilane or trimethylsiloxydichlorosilane; an alkoxysilane such as trimethoxysilane, triethoxysilane, methyldimethoxysilane, phenyldimethoxysilane or 1,3,3,5,5,7,7-heptamethyl-1,1-dimethoxytetrasiloxane; an acyloxysilane such as methyldiacetoxysilane or trimethylsiloxymethylacetoxysilane; a ketoxymatesilane such as bis(dimethylketoxymate)methylsilane, bis(cyclohexylketoxymate)methylsilane or bis(diethylketoxymate)trimethylsiloxysilane; a hydrosilane such as dimethylsilane, trimethylsiloxymethylsilane or 1,1-dimethyl-2,2-dimethyldisiloxane; an alkenyloxysilane such as methyltri(isopropenyloxy)silane, and the like. The silicon hydride compounds usable in the invention are not limited to the exemplified compounds.

In the preparation of the polyether having a reactive silicon-containing group by the process mentioned above, after reacting the silicon hydride compound (2) and the polyether having the olefin group (3), a part or all of the groups X can be further converted into other hydrolyzable groups or hydroxyl groups. For instance, in the case that the group X is a halogen atom or hydrogen atom, it is rather preferable for use to convert into an alkoxyl group, an acyloxy group, aminoxy group, an alkenyloxy group or hydroxyl group.

In the above formula (1) or (3), $R^2$ is hydrogen atom or a monovalent organic group having 1 to 20 carbon atoms, preferably hydrogen atom or a hydrocarbon group having 1 to 20 carbon atoms, more preferably hydrogen atom. Also, the group $R^1$ which is a bivalent organic group having 1 to 20 carbon atoms, is preferably a hydrocarbon group or a hydrocarbon group containing ether bond, ester bond, urethane bond or carbonate bond, and in particular, methylene group is preferred.

The polyether having the olefin group of the formula (3) can be prepared, for instance, by a process as disclosed in Japanese Unexamined Patent Publication No. 6097/1979, or by a process wherein an epoxy compound such as ethylene oxide or propylene oxide is copolymerized with an olefin-containing epoxy compound such as allyl glycidyl ether to introduce the olefin group into the side chain of the produced polyether.

The polyether used as a component (A) in the present invention is a polymer of which the main chain has chemically linked recurring units shown substantially by the general formula: —$R^4O$— wherein $R^4$ is a bivalent organic group, preferably a bivalent hydrocarbon group having 1 to 8 carbon atoms. The polyether (A) having the recurring units —$R^4O$— wherein all or most of the group $R^4$ are a hydrocarbon group having 1 to 4 carbon atoms, is more preferable. Typical examples of the group $R^4$ are —$CH_2$—, —$CH_2CH_2$—, —$CH(CH_3)$—$CH_2$—, —$CH(C_2H_5)$—$CH_2$—, —$C(CH_3)_2$—$CH_2$—, —$CH_2CH_2CH_2CH_2$—, and the like. The —$CH(CH_3)$—$CH_2$— group is particularly preferred as the group $R^4$. The polyether (A) may contain one or more kinds of the recurring unit —$R^4O$—. The molecular weight of the polyether (A) is usually selected from 500 to 30,000, preferably from 3,000 to 15,000. These polyether can be prepared by a process disclosed in Japanese Unexamined Patent Publication No. 129247/1978 or No. 6097/1979.

The acrylate polymer and/or methacrylate polymer used as the component (B) in the present invention may be a homo- or co-polymer of an acrylate monomer and/or a methacrylate monomer, may be an admixture thereof, and may be a copolymer obtained by copolymerizing more than two kinds of monomers selected from the group consisting of an alkyl acrylate monomer and an alkyl methacrylate monomer. The alkyl group in the acrylate or methacrylate monomer may be a branched alkyl group or a linear alkyl group.

Typical examples of the alkyl group are, for instance, methyl, ethyl, n-propyl, isopropyl, n-butyl, isobutyl, 1-ethylpropyl, 1-methylpentyl, 2-methylpentyl, 3-methylpentyl, 1-ethylbutyl, 2-ethylbutyl, isooctyl, 3,5,5-trimethylhexyl, 2-ethylhexyl, decyl, dodecyl, and the like.

In the present invention about 50% (% by weight, hereinafter the same) of the alkyl acrylate and/or the alkyl methacrylate monomers may be displaced by other copolymerizable unsaturated monomers. Nonexclusive examples of the copolymerizable unsaturated monomers are, for instance, a styrene monomer such as styrene, α-methylstyrene, vinyltoluene, 2-chlorostyrene, or the like; a vinyl ether such as ethyl vinyl ether, isobutyl vinyl ether, 2-ethylhexyl vinyl ether, or the like; an acrylic or methacrylic acid compound having carboxyl group, hydroxyl group, epoxy group, amino group or amido group such as acrylic acid, methacrylic acid, 2-hydroxyethyl acrylate, 2-hydroxylethyl methacrylate, glycidil acrylate, glycidil methacrylate, N-methylaminoethyl acrylate, acrylamide, N-methylolacrylamide, or the like; an unsaturated monomer having at least two functional groups capable of copolymerizing in a molecule such as polyethylene glycol diacrylate, polyethylene glycol dimethacrylate, polypropylene glycol diacrylate, polypropylene glycol dimethacrylate, trimethylolpropane triacrylate, trimethylolpropane trimethacrylate, oligoester acrylate, methylenebisacrylamide, diallyl phthalate, or the like; a vinyl monomer having 2 to 30 carbon atoms such as maleic acid anhydride, vinyl cinnamate, vinylpyridine, acrylonitrile, methacrylonitrile, ethylene, propylene, vinyl chloride, vinylidene chloride, vinyl acetate, butadiene, chloroprene, or the like; a monomer having both of a reactive silicon-containing group and a polymerizable unsaturated group such as vinyltrimethoxysilane, vinyltriethoxysilane, vinylmethyldimethoxysilane, vinylmethyldiethoxysilane, γ-methacryloxypropyltrimethoxysilane, γ-methacryloxypropyltriethoxysilane, γ-methacryloxypropylmethyldimethoxysilane, γ-methacryloxypropylmethyldiethoxysilane, γ-acryloxypropyltrimethoxysilane, γ-acryloxypropyltriethoxysilane, γ-acryloxypropylmethyldimethoxysilane, γ-acryloxypropylmethyldiethoxysilane, or the like.

The copolymerizable monomer can improve adhesive property and cohesive force, but when the amount of the copolymerizable monomer is more than about 50% of the monomer mixture, there rise a drawback that compatibility of the component (B) with the component (A) becomes low.

The preferred component (B) is an acrylic polymer containing an alkyl acrylate of which the alkyl group has 2 to 14 carbon atoms as a main component.

The mixing ratio of the component (A) and the component (B) in the curable composition of the present invention varies depending on the composition and molecular weight of the polymer (B), and usually selected from 100/1 to 1/100 by weight. In case that the mixing ratio is out of the above range, the desired effect of the present invention cannot be obtained.

The polymer of the component (B) can be easily obtained by a conventional polymerization such as solution polymerization, emulsion polymerization or bulk polymerization.

The acrylate and/or methacrylate polymers having a reactive silicon-containing group at the polymer end which are usable as a component (B), can be prepared by various processes, e.g. (i) a process in which an acrylate or methacrylate monomer is polymerized in the presence of a radical polymerization initiator having a reactive silicon-containing group of the general formula (4):

$$\begin{array}{c} R^3_{3-a} \\ | \\ -Si-X_a \end{array} \quad (4)$$

wherein $R^3$, X and "a" are as defined above, (ii) a process in which an acrylate or methacrylate monomer is polymerized in the presence of a radical polymerization chain transfer agent having the reactive silicon-containing group (4) (iii) a process in which an acrylate or methacrylate monomer is polymerized in the presence of both of the initiator and the chain transfer agent used in the above processes (i) and (ii), and (iv) a process in which an acrylate or methacrylate monomer is polymerized in the presence of a radical polymerization initiator having a functional group (C) such as carboxyl group, hydroxyl group, a halogen atom, amino group or epoxy group and/or a radical polymerization chain transfer agent having the functional group (C) to produce a polymer having at the polymer end the functional group (C) which may be further reacted with a polyfunctional compound such as a triisocyanate to produce a polymer having a functional group (C'), and then the functional group (C) or (C') is reacted with a silicon compound having both the reactive silicon-containing group (4) and a functional group (D) capable of reacting with the functional group (C) or (C') such as isocyanate group, carboxyl group, hydroxyl group, a halogen, amino group, epoxy group, mercapto group or acryloyloxy group. For instance, processes for preparing a polymer having the functional group (C) are disclosed in detail in Japanese Examined Patent Publication No. 17437/1971 and No. 38740/1978 and Japanese Unexamined Patent Publication No. 64242/1978 and No. 69206/1983. Also, as a process for producing a polymer having the functional group (C'), there is exemplified a process in which the functional group (C) such as carboxyl group, hydroxyl group or amino group is reacted with a polyisocyanate compound such as toluene diisocyanate to produce a polymer having the functional group (C') containing isocyanate group. However, the preparation of polymers having the functional group (C) or (C') is not limited to these processes.

Azo and peroxide compounds are employed as radical polymerization initiators having the silicon functional group (4).

Prefeable azo radical polymerization initiators are compounds of the general formula (5):

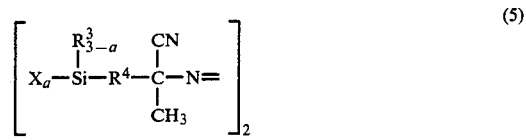

wherein $R^3$, X and "a" are as defined above, and $R^4$ is a bivalent hydrocarbon group having 2 to 18 carbon atoms. In particular, the compounds of the formula (5) wherein X is an alkoxy group such as methoxy group or ethoxy group, are preferable. Typical examples of such azo initiators are, for instance,

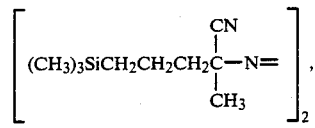

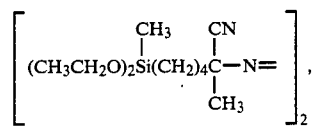

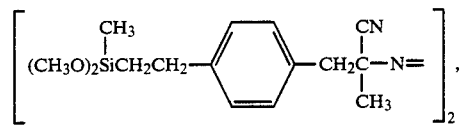

-continued

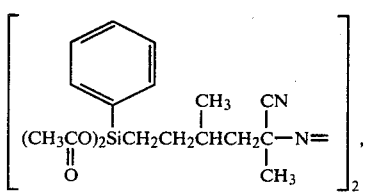

azobis-2-(6-methyldimethoxysilyl-2-cyanohexane),

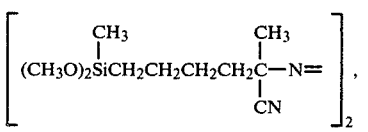

azobis-2-(6-trimethoxysilyl-2-cyanohexane), azobis-2-(6-methyldiacetoxysilyl-2-cyanohexane), and the like. The azo initiators used in the present invention are not limited to the above exemplified compounds.

Typical examples of the peroxide radical polymerization initiators are, for instance,

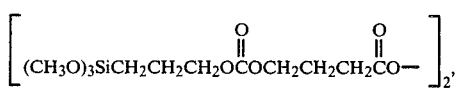

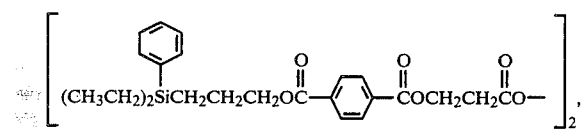

and the like. The peroxide initiators used in the invention are not limited to the above exemplified compounds.

The radical polymerization chain transfer agents having the silicon functional group (4) used in the present invention include, for instance, a compound of the general formula (6):

(6)

wherein $R^3$, X and "a" are as defined above, and $R^5$ is a bivalent hydrocarbon group having 1 to 18 carbon atoms, and a compound of the general formula (7):

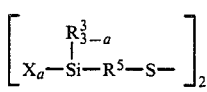

(7)

wherein $R^3$, $R^5$, X and "a" are as defined above. Typical examples of the group $R^5$ are methylene, ethylene, propylene, butylene, hexylene, phenylene and cyclohexylene. As the group X, an alkoxy group such as methoxy group or ethoxy group is particularly preferable from the viewpoint of easiness in handling. Representative examples of the chain transfer agents shown by the general formulas (6) and (7) are, for instance, $(CH_3O)_3SiCH_2CH_2CH_2SH$, $[(CH_3O)_3SiCH_2CH_2CH_2S—]_2$,

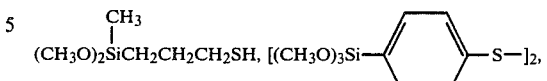

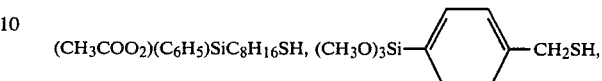

and the like.

The mixing of the component (A) and the component (B) may be carried out by uniformly admixing the component (B) with the component (A) when the component (B) is obtained by bulks polymerization of solution polymerization, and by uniformly admixing the component (B) with the emulsified component (A) when the component (B) is an aqueous system such as aqueous emulsion.

In the present invention the component (B) may be cross-linked with each other and/or with the component (A) in case that a reactive group is introduced into the component (B). Particularly in case that the component (B) has a reactive silicon-containing group at the polymer end and/or side, the component (B) is easy to cross-link with the component (A).

The curing composition of the present invention may contain various other additives, as occasion demands.

In case of preparing the curing composition intended for use as a sealing material, there may be incorporated in the composition, plasticizer, filler, reinforcement, antisagging agent, coloring agent, age resister, adhesion accelerator, curing catalyst and modifier for adjusting physical properties.

Examples of the plasticizer which is used, for instance, for adjusting the physical and other properties of the cured product, are a phthalate such as dibutyl phthalate, diheptyl phthalate, di(2-ethylhexyl) phthalate, butylbenzyl phthalate or butylphthalylbutyl glycolate; a non-aromatic dibasic acid ester such as dioctyl adipate or dioctyl sebacate; a polyalkylene glycol ester such as diethylene glycol dibenzoate or triethylene glycol dibenzoate; a phosphoric acid ester such as tricresyl phosphate or tributyl phosphate; a chlorinated paraffin; a hydrocarbon oil such as an alkyl diphenyl or a partially hydrogenated terphenyl, and the like. The plasticizers may be employed alone or in admixture thereof. Also, the plasticizers may be added at the time of preparing the polymers.

As fillers and reinforcements, there are employed usual fillers and reinforcements, e.g. heavy and light calcium carbonate, calcium carbonate surface-treated with a fatty acid, resin acid or a cationic or anionic surface active agent, magnesium carbonate, talc, titanium dioxide, barium sulfate, alumina, metal powder such as aluminum, zinc or iron, bentonite, kaolin, clay, silica, quartz powder, and carbon black. These fillers and reinforcements may be employed alone or in admixture thereof. In particular, it is possible to obtain a sealing material having an excellent transparency by using a filler or reinforcement capable of providing a transparency such as silica.

Examples of the antisagging agent are, for instance, a hydrogenated castor oil derivative, and a metal soap such as calcium stearate, aluminum stearate or barium stearate.

Usual inorganic pigments, organic pigments and dyes can be used in the present invention.

The modifier for adjusting the physical properties is useful, for instance, for raising the hardness of the cured product or for lowering the hardness to provide the cured product with the elongation. Examples of the modifier are, for instance, various silane coupling agents, e.g. an alkylalkoxysilane such as methyltrimethoxysilane, dimethyldimethoxysilane, trimethylmethoxysilane or n-propyltrimethoxysilane, an alkylisopropenoxysilane such as dimethyldiisopropenoxysilane, methyltriisopropenoxysilane or γ-glycidoxypropylmethyldiisopropenoxysilane, an alkoxysilane having a functional group such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane or γ-mercaptopropylmethyldimethoxysilane; silicone varnishes; and polysiloxanes.

The polymers themselves used in the present invention have a good adhesive property to materials such as glasses, ceramics and metals, and also it is possible to provide the composition with a good adhesive property to a wide range of materials by incorporation of various primers. Accordingly, though the use of the adhesion accelerator is not always necessary, the adhesive property of the composition to various kinds of materials can be further improved by incorporation of one or more kinds of the adhesion accelerators such as epoxy resins, phenol resins, various silane coupling agents and aromatic polyisocyanates.

Examples of the curing catalyst are, for instance, a titanate such as tetrabutyl titanate or tetrapropyl titanate; an organo tin compound such as dibutyl tin dilaurate, dibutyl tin diacetate, tin octylate or tin naphthenate; lead octylate; an amine compound such as butylamine, octylamine, dibutylamine, monoethanolamine, diethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine or 1,3-diazabicyclo(5,4,6)undecene-7, and a salt thereof with a carboxylic acid; a low molecular polyamide obtained by the reaction of an excess polyamine with a polybasic acid; a reaction product of an excess polyamine with an epoxy compound; a silane coupling agent having amino group, e.g. a known silanol condensation catalyst such as γ-aminopropyltrimethoxysilane or N-(β-aminoethyl)aminopropylmethyldimethoxysilane; and the like. The curing catalysts may be employed alone or in admixture thereof.

A solvent may be added to the composition of the invention for the purpose of improving the workability or lowering the viscosity, e.g. an aromatic hydrocarbon solvent such as toluene or xylene; an ester solvent such as ethyl acetate, butyl acetate, amyl acetate or an acetic acid ester of ethylene glycol ether; a ketone solvent such as methyl ethyl ketone, methyl isobutyl ketone or diisobutyl ketone. These solvents may also be used at the time of preparing the polymer.

Usual antioxidants and ultraviolet absorbents can be used as age resisters in the invention.

The curing composition of the invention intended for use as sealing material may be prepared as a one component moisture-curable type. In that case, the composition containing all ingredients is stored in a sealed container. The applied composition hardens by moisture in air. Alternatively, the composition of the invention may be prepared as a two component type. In that case, a hardener composition containing a curing catalyst, a filler, a plasticizer and water is separately prepared, and a polymer composition is admixed with the hardener composition before use.

In case of preparing the one component composition, it is preferable that ingredients containing water are used after dehydrating or drying, or blending of ingredients is conducted while dehydrating by reducing the pressure or other means. In case of a two component curing composition, a trouble of gellation is little even if the additives contain a slight amount of water, since it does not contain a curing catalyst. However, when the storage stability for a long term is required, it is desirable to dry the additives to dehydrate. For the dehydration and drying, there are preferably adopted a heat drying method for solid additives, for instance, in the form of powder, and a reduced pressure dehydration method or a dehydration method using synthetic zeolite, activated alumina or silica gel for liquid additives. Water in the composition may also be removed by incorporating a small amount of an isocyanate compound, thereby causing water to react therewith to dehydrate. In addition to the above dehydration and drying methods, it is effective for further improving the storage stability of the composition to add a lower alcohol such as ethanol or methanol, or an alkoxysilane such as γ-mercaptopropylmethyldimethoxysilane or γ-glycidoxypropyltrimethoxysilane.

The curing composition intended for use as a pressure sensitive adhesive can also be prepared in the same manner as above. That is to say, the additives as used for the preparation of a sealing material such as curing catalyst, age resister, plasticizer, reinforcement, modifier for adjusting physical properties and solvent may be used, as occasion demands. In some cases, other known additives used in usual pressure sensitive adhesive compositions may also be added, e.g. phenol resin, xylene resin, cumarone resin, petroleum resin, terpene resin, terpene-phenol resin, and the like. The pressure sensitive adhesive composition of the present invention can be applied to various materials such as tapes, sheets, labels and foils. For instance, the composition of solvent type, emulsion type or hot melt type is coated onto substrates such as synthetic resin or modified natural resin films, papers, all kinds of cloths, metal foils, metallized plastic films, and asbestos or glass fiber cloths, and is exposed to moisture or water to cure at ordinary temperature or with heating.

The uses of the curing composition of the present invention are not limited to a sealing material and a pressure sensitive adhesive, but it can also be employed as a paint, an adhesive, a modifier, a foam material, a water proofing material, a spraying material, a rubber material, and the like.

The present ivnention is more specifically described and explained by means of the following Examples, in which all % and parts are by weight unless otherwise noted. It is to be understood that the present invention is not limited to the examples, and various changes and modifications may be made in the invention without departing from the spirit and scope thereof.

Also, reference examples are presented below to illustrate the preparation of the components (A) and (B) used in the present invention.

REFERENCE EXAMPLE 1

A pressure reactor equipped with a stirrer was charged with 800 g. of polypropylene oxide having allyl ether groups at 97% of the total polymer ends and an average molecular weight of 8,000 (which was prepared by employing polypropylene oxide as a starting material). To the reactor were added 15 g. of methyldimethoxysilane and then 0.34 ml. of a solution of chloroplatinic acid catalyst prepared by dissolving 8.9 g. of $H_2PtCl_6\cdot6H_2O$ in 18 ml. of isopropanol and 160 ml. of tetrahydrofuran, and the reaction was carried out at 80° C. for 6 hours. As a result of determination of the residual hydrosilyl group by infrared spectrophotometry, it was found that most of the silane compound were reacted, thus it was confirmed that polypropylene oxide having

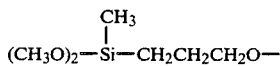

group at the polymer end was obtained.

REFERENCE EXAMPLE 2

A pressure reactor equipped with stirrer was charged with 900 g. of polypropylene oxide having allyl ether groups at 96% of the total polymer ends and an average molecular weight of 9,000 (which was prepared by employing a mixture of 90% of polypropylene oxide and 10% of a triol type polypropylene oxide as a starting material). To the reactor were added 60 g. of a silicon compound of the following formula:

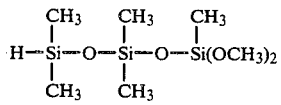

and 0.3 ml. of the same chloroplatinic acid catalyst solution as used in Reference Example 1 in that order. The reaction was carried out at 80° C. for 6 hours to produce a polypropylene oxide having the end group of the following formula:

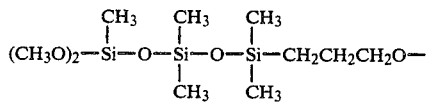

REFERENCE EXAMPLE 3

The procedure of Reference Example 1 was repeated except that 12 g. of trimethoxysilane was employed instead of methyldimethoxysilane, to produce a polypropylene oxide having $(CH_3O)_3SiCH_2CH_2CH_2O-$ group at the polymer end.

EXAMPLE 1

A reactor was charged with 100 parts of butyl acrylate, 150 parts of toluene and 0.5 part of benzoyl peroxide, and the reaction was carried out at 80° C. for 8 hours under a nitrogen atmosphere with stirring to give a solution of an acrylate polymer.

To 100 parts of the silyl group-containing polyether obtained in Reference Example 1 or 2 was added 50 parts of the butyl acrylate polymer solution obtained above. After uniformly admixing, 2 parts of dibutyl tin maleate was added to the mixture and uniformly admixed to give an adhesive composition in the form of a solution.

Each of the thus obtained two compositions was applied to a transparent polyester film having a thickness of 25 μm., and was dried at 130° C. for 3 minutes, thereby simultaneously causing the polymers to crosslink. The films were transparent and tacky and had a thickness of about 40 μm.

EXAMPLE 2

A solution of an acrylic polymer was prepared in the same manner as in Example 1 except that the reactor was charged with 95 parts of 2-ethylhexyl acrylate, 3 parts of acrylic acid, 2 parts of vinyl acetate, 0.5 part of benzoyl peroxide and 150 parts of toluene.

To 100 parts of the silyl group-containing polyether obtained in Reference Example 3 was added 80 parts of the acylic polymer solution. After uniformly admixing, 2 parts of dibutyl tin dilaurate was added to and admixed uniformly with the mixture to give an adhesive composition in the form of a solution.

The composition was applied to a transparent polyester film having a thickness of 25 μm., and was heated at 130° C. for 3 minutes to simultaneously conduct drying and cross-linking, thus giving an adhesive film having a transparency, a tackiness and a thickness of about 60 μm.

The thus obtained pressure sensitive adhesive film with the polyester film was laminated onto a stainless steel plate, and was subjected to a 180° peeling test (rate of tension: 300 mm./minute). The adhesive did not remain on the stainless steel plate, and also peeling between the polyester film and the adhesive film was not observed. The adhesive strength measured at that time was 450 g./25 mm. The cohesive strength (static load 1,000 g., at 30° C.) was good, i.e. 0 mm./15 min. The initial tackiness (measured by J. Dow type ball tack measuring method) was 18 at 30° C. and 10 at 0° C., thus it was observed that the pressure sensitive adhesive had a good low temperature characteristic.

EXAMPLE 3

A small amount of trilene diisocyanate was added to an adhesive composition in the form of a solution obtained by copolymerizing 85 parts of 2-ethylhexyl acrylate, 5 parts of acrylic acid and 10 parts of vinyl acetate in 150 parts of toluene in a usual manner. The composition was applied to a polyester film having a thickness of 25 μm. and dried at 130° C. for 3 minutes to form a tacky film having a thickness of about 40 μm. The initial tackiness of the thus obtained adhesive film measured by the same method as in Example 2 was 14 at 30° C. and 2 at 0° C.

On the other hand, 40 parts of the silyl group-containing polyether obtained in Reference Example 3 was added to an uniformly dissolved in 100 parts of the composition obtained above. After adding 2 parts of the reaction product of dibutyl tin oxide and dioctyl phthalate, the mixture was applied to a polyester film having a thickness of 25 μm. and dried at 130° C. for 10 minutes to form a tacky film having a thickness of about 40 μm. The thus obtained adhesive film had initial tackinesses of 17 at 30° C. and 8 at 0° C. and a cohesive strength of 0 mm./15 min. (static load 1,000 g., at 30° C.).

COMPARATIVE EXAMPLE 1

To 100 parts of the silyl group-containing polyether obtained in Reference Example 3 was added 2 parts of dibutyl tin maleate. After uniformly admixing, the mixture was applied to a 25 μm. thick polyester film in a thickness of 60 μm. and cured by heating at 130° C. for 3 minutes. The formed film with the polyester film was laminated onto a stainless steel plate and was subjected to the 180° peeling test (rate of tension: 300 mm./minute). The adhesive strength was 45 g./25 mm.

COMPARATIVE EXAMPLE 2

To 100 parts of the silyl group-containing polyether obtained in Reference Example 3 were added 240 parts of a 50% toluene solution of a terpene-phenol resin (commercially available under the commercial name "YS Polystar T-115" made by Yasuhara Yushi Kogyo Co., Ltd.) and 2 parts of dibutyl tin dilaurate, and uniformly admixed to give an adhesive composition in the form of a solution. The composition was applied to a transparent polyester film having a thickness of 25 μm., and heated at 130° C. for 3 minutes to simultaneously conduct drying and cross-linking, thus giving a transparent tacky film having a thickness of 60 μm. The thus obtained film was laminated onto a stainless steel plate and was subjected to the 180° peeling test. There was observed a contamination phenomenon such that a part of the adhesive film peeled off from the polyester film and remained on the stainless steel adherend.

REFERENCE EXAMPLE 4

The ingredients shown in Table 1 were admixed and uniformly dissolved with stirring, and 25 g. of the obtained mixture was placed in a 200 ml. four necked flask equipped with a condenser and replaced with a dry nitrogen gas, and was heated at 30° C. in a nitrogen stream on an oil bath. The polymerization began to start several minutes after and heat generated. After the heat generation became calm, the remaining mixture was gradually added dropwise to the flask through a dropping funnel over 3 hours. The polymerization was finished at the time when no heat generation was observed, to give a polymer.

The obtained polymer had a viscosity of 490 poises at 20° C. and an average molecular weight of 6,000 measured by gel permeation chromatography. The average number of reactive silicon-containing functional groups included in one polymer molecule (obtained by calculation based on the average molecular weight and the amount of the reactive silicon functional group-containing monomer charged) was 2.4.

REFERENCE EXAMPLES 5 TO 8

The procedures of Reference Example 4 were repeated by employing the ingredients shown in Table 1 to give polymers.

The results are shown in Table 1.

In Table 1, "Cat-1" shows a polymerization initiator of the formula:

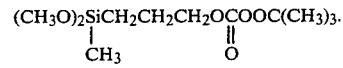

TABLE 1

| Ref. Ex. No. | Composition (g.) | | | | | Polymer | |
|---|---|---|---|---|---|---|---|
| | Acrylate monomer | Acrylate comonomer | Reactive silicon functional group-containing monomer | Chain transfer agent | Initiator | Average molecular weight | Number of reactive silicon functional groups per molecule |
| 4 | Butyl acrylate (100) | — | — | γ-Mercapto-propyl-methyl-dimethoxy-silane (3.6) | Azobis-2-(6-methyl-dimethoxy-silyl-2-cyano-hexane (5.1) | 6000 | 2.4 |
| 5 | 2-Ethyl-hexyl acrylate (80) | Vinyl acetate (20) | Vinyltrimethoxy-silane (1.0) | γ-Mercapto-propyltri-ethoxy-silane (2.4) | Azobis-2-(6-methyl-diethoxy-silyl-2-cyano-hexane (4.8) | 8500 | 2.7 |
| 6 | Heptyl acrylate (100) | — | γ-Methacryloyloxy-propyltrimethoxy-silane (2.5) | — | Cat-1 (2.8) | 12200 | 2.3 |
| 7 | Butyl acrylate (100) | — | γ-Methacryloyloxy-propylmethyl-dimethoxysilane (1.5) | γ-Mercapto propyl-methy-dimethoxy-silane (3.6) | α,α'-Azobis-isobutyro-nitrile (2) | 6200 | 1.5 |
| 8 | Butyl acrylate (100) | Acrylic acid (0.5) | — | 2-Mercapto-acetic acid (3.5) | α,α'-Azobis-isobutyro-nitrile (0.5) | 6500 | — |

REFERENCE EXAMPLE 9

A flask equipped with a stirrer were charged with 60 g. of the polymer obtained in Reference Example 8, 1.2 g. of γ-isocyanatepropyltrimetoxysilane and 0.1 g. of dibutyl tin dilaurate, and the reaction was carried out at 100° C. for 5 hours in a nitrogen stream with stirring. The reaction of the terminal carboxyl groups of the polymer and the isocyanate group occurred, thus a polymer having trimethoxysilyl functional groups was obtained. The number of reactive silicon functional groups included in one polymer molecule (obtained by calculation based on the average molecular weight and the amount of the charged reactive silicon functional group-containing monomer) was 1 on the average.

Δ: Hair cracks
X: Large cracks

The results are shown in Table 2.

COMPARATIVE EXAMPLE 3

A cured sheet was prepared in the same manner as in Example 4 except that only the polypropylene oxide having the silyl end groups was employed without employing the acrylate polymer.

The results are shown in Table 2.

TABLE 2

| | Components (A) and (B) in curing composition (g.) | | Properties of cured product | | | | | | | |
|---|---|---|---|---|---|---|---|---|---|---|
| | | | Elongation at break | Tensile strength | Weather resistance (hour) | | | | | |
| | (A) | (B) | (%) | (kg/cm$^2$) | 250 | 500 | 750 | 1000 | 1500 | 2000 |
| Ex. 4 | 30 | Polymer of Ref. Ex. 4 (70) | 680 | 5.8 | O | O | O | O | Δ | Δ |
| Ex. 5 | 70 | Polymer of Ref. Ex. 5 (30) | 570 | 6.2 | O | O | O | Δ | Δ-X | Δ-X |
| Ex. 6 | 40 | Polymer of Ref. Ex. 6 (60) | 630 | 5.6 | O | O | O | O | Δ | Δ |
| Ex. 7 | 60 | Polymer of Ref. Ex. 7 (40) | 580 | 6.5 | O | O | O | Δ | Δ | Δ-X |
| Ex. 8 | 80 | Polymer of Ref. Ex. 9 (20) | 560 | 7.2 | O | O | Δ | Δ | Δ-X | X |
| Com. Ex. 3 | 100 | — | 660 | 5.7 | O | Δ | Δ-X | X | — | — |

REFERENCE EXAMPLE 10

A flask equipped with a stirrer were charged with 300 g. of polypropylene glycol having an average molecular weight of 3,000, 26 g. of toluenediisocyanate and 0.2 g. of dibutyl tin dilaurate, and the reaction was carried out at 100° C. for 5 hours in a nitrogen stream with stirring. To the flask was added 16.3 g. of γ-aminopropylmethyldimethoxysilane, and was further reacted at 100° C. for 3 hours with stirring to give a polymer having an average molecular weight of about 6,500 and terminal methyldimethoxysilyl group.

EXAMPLES 4 TO 6

A polypropylene oxide having an average molecular weight of about 8,000 and silyl end groups [80% of the total end groups being a reactive silicon functional group of the formula: (CH$_3$O)$_2$Si(CH$_3$)—CH$_2$CH$_2$C-H$_2$O—] was admixed with each of the acrylate polymers obtained in Reference Examples 4 to 7 and 9 in a ratio shown in Table 2. To 100 g. of each of the obtained mixtures were added 20 g. of dioctyl phthalate, 20 g. of rutile titanium dioxide, 100 g. of calcium carbonate treated with a fatty acid and 0.3 g. of styrenated phenol, and mixed by a three roller paint mill to give a paste. After adding 2 g. of dibutyl tin dilaurate and 1 g. of laurylamine to the paste and thoroughly mixing, the paste was poured into a frame having a depth of 3 mm. and cured in a dryer at 23° C. and 55% RH for 7 days and then at 50° C. for 7 days to give a cured sheet.

The obtained cured sheets were punched to give No. 3 dumbbell specimens provided in Japanese Industrial Standard (JIS) K 6301, and the specimens were subjected to a tensile test (rate of tension: 500 mm./minute) using a universal testing machine to measure the elongation at break and tensile strength at break. Also, the weather resistance of the cured sheets were measured by placing them in a sunshine weather-o-meter and observing the state of the deterioration of the sheet surface. The weather resistance was estimated by the naked eye according to the following criteria.
O: No abnormality As understood from Table 2, curing compositions prepared by mixing a polyether having silyl groups with an acrylate polymer having silyl end groups according to the present invention can provide cured products having an improved weather resistance as well as elongation and tensile strength maintained high.

EXAMPLE 9

A cured sheet was prepared in the same manner as in Example 7 except that the polymer obtained in Reference Example 10 was employed as a component (A), and the properties thereof were measured.

The cured sheet had high elongation and tensile strength, i.e. an elongation at break of 460% and a tensile strength at break of 9.4 kg./cm.$^2$, and also had a good weather resistance such that in the weathering test, no abnormality was observed after 1,000 hours and slight hair cracks were merely observed after 1,500 hours.

EXAMPLE 10

There were blended 10 g. of the polypropylene oxide having silyl end groups used in Example 4 and 10 g. of the polybutyl acrylate having reactive silicon functional groups obtained in Reference Example 4, and to the blend were added 10 g. of a terpene-phenol resin having a softening point of 115° C. and 10 g. of toluene to give a polymer solution.

To the obtained solution was added 0.3 g. of dibutyl tin maleate, and the solution was applied to a polyester film and dried and cured at 130° C. for 10 minutes to give a pressure sensitive adhesive tape having an adhesive layer of 30 μm. in thickness. The adhesive strength of the tape measured at 20° C. according to JIS C 2107-631 was 580 g./19 mm. This result indicates that the composition of the present invention is useful as an adhesive material.

REFERENCE EXAMPLE 11

A linear random vinyl copolymer useful as a comonent (B) having hydrolyzable silyl groups in the side chains and an average molecular weight of 8,000 was prepared by polymerization at 80° C. for 10 hours using 25 parts of styrene, 2 parts of N-methylolacrylamide, 20 parts of γ-methacryloyloxypropyltrimethoxysilane, 37 parts of methyl methacrylate, 16 parts of n-butyl acrylate, 100 parts of xylene as a solvent, 2 parts of azobisisobutyronitrile as an initiator and 2 parts of n-dodecylmercaptane as a chain transfer agent.

EXAMPLES 11 TO 13 AND COMPARATIVE EXAMPLE 4

A composition was prepared by thoroughly admixing a polypropylene oxide having $(CH_3O)_2Si(CH_3)$—$CH_2CH_2CH_2O$— groups at 80% of the total ends and an average molecular weight of 8,200 as a component (A), calcium carbonate, titanium dioxide, dioctyl phthalate, hydrogenated caster oil, styrenated phenol as an age resister, dibutyl tin dilaurate as a curing catalyst and the vinyl polymer obtained in Reference Example 11 as a component (B) in prescribed amounts shown in Table 3 in the absence of water. The composition was applied to the adherends shown in Table 4, cured at 20° C. for 7 days and subjected to a hand peeling test to estimate the adhesive property. The adhesive property was estimated according to the following criteria.

O: A cured composition is broken in cohesive failure.
Δ: A cured composition is broken in cohesive failure in an area of less than 50%.
×: A cured composition is peeled off from an adherend.

The results of the peeling test are shown in Table 4.

Also, the composition in the form of a sheet having a thickness of 3 mm. was cured at 23° C. for 14 days, and the cured sheet was subjected to an exposure test in a sunshine weather-o-meter ("Standard Sunshine Super Long-Life Weather Meter" made by Suga Test Instrument Co., Ltd.).

The results of the weathering test are also shown in Table 4.

TABLE 3

| | Amounts (part) | | | |
|---|---|---|---|---|
| | Ex. 11 | Ex. 12 | Ex. 13 | Com. Ex. 4 |
| Component (A) | 100 | 100 | 100 | 100 |
| Calcium carbonate | 130 | 130 | 130 | 130 |
| Titanium dioxide | 20 | 20 | 20 | 20 |
| Dioctyl phthalate | 40 | 40 | 40 | 40 |
| Styrenated phenol | 1 | 1 | 1 | 1 |
| Hydrogenated caster oil | 4 | 4 | 4 | 4 |
| Dibutyl tin dilaurate | 2 | 2 | 2 | 2 |
| Component (B) | 5 | 10 | 20 | 0 |

TABLE 4

| | Ex. 11 | Ex. 12 | Ex. 13 | Com. Ex. 4 |
|---|---|---|---|---|
| Adhesive property Adherend | | | | |
| Glass | | | | |
| Anodic oxidation-treated aluminum | | | | × |
| Electrolytically pigmented aluminum | | | | × |
| Acrylic resin-stoved aluminum | | | | × |
| Aluminum foil | | | | Δ |
| Polyvinyl chloride cushion floor sheet | | | | × |
| Polyvinyl chloride-decorated steel plate | | | | × |
| Mortar slate plate | | | | × |
| Color steel plate | | | | × |
| Weather resistance | | | | |
| Surface deterioration after 2,000 hour | No change | No change | No change | Fine hair |

TABLE 4-continued

| | Ex. 11 | Ex. 12 | Ex. 13 | Com. Ex. 4 |
|---|---|---|---|---|
| sunshine exposure | | | | cracks |

What we claim is:
1. A curing composition which comprises (A) a polyether having at least one reactive silicon-containing group in the molecule, wherein the main chain of the polyether consists of chemically linked recurring units represented by the general formula:

—R$^4$O— wherein R$^4$ is a bivalent hydrocarbon group having 1 to 8 carbon atoms, the reactive silicon-containing group is a group represented by the general formula:

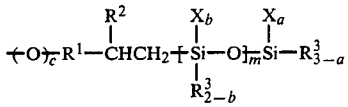

wherein R$^1$ is a bivalent organic group having 1 to 20 carbon atoms, R$^2$ is hydrogen or a monovalent organic group having 1 to 20 carbon atoms, R$^3$ is a monovalent hydrocarbon group having 1 to 20 carbon atoms, or a triorganosiloxy group represented by the formula: (R')$_3$SiO— wherein R' is a monovalent hydrocarbon group having 1 to 20 carbon atoms, a is 0, 1, 2 or 3, b is 0, 1 or 2, c is 0 or 1, provided that $1 \leq a+b \leq 4$, X is hydroxyl group or a hydrolyzable group, and m is 0 or an integer of 1 to 18, and (B) a polymer selected from the group consisting of an acrylate polymer, a methacrylate polymer and an admixture thereof, wherein the polymer is prepared from a monomeric mixture containing at least 50% by weight of an alkyl acrylate monomer or an alkyl methacrylate monomer, in which said alkyl group has 2 to 14 carbon atoms.

2. The composition of claim 1, wherein R$^4$ of said recurring unit represented by the formula:

—R$^4$O— is selected from the group consisting of —CH$_2$—, —CH$_2$CH$_2$—, —CH(CH$_3$)—CH$_2$—, —CH(C$_2$H$_5$)—CH$_2$, —C(CH$_3$)$_2$—CH$_2$—, —CH$_2$CH$_2$CH$_2$CH$_2$— and —CH(CH$_3$)—CH$_2$.

3. The composition of claim 1, wherein the molecular weight of the polyether is 500 to 30,000.

4. The composition of claim 1, wherein the polymer (B) has at least one reactive silicon-containing group in the molecule, wherein the silicon-containing group is a group represented by the formula:

wherein R$^3$ and X are as defined above and a is 1, 2 or 3.

5. The composition of claim 3, wherein the polymer (B) has the reactive silicon-containing group at the polymer end or ends.

6. The composition of claim 1, wherein said hyrolyzable group is selected from the group consisting of halogen, hydrogen, an alkoxy group, an acyloxy group, a ketoxymate group, an amino group, an amido group, an aminoxy group, a mercapto group and an alkenyloxy group.

7. The composition of claim 1, wherein the mixing ratio of the component (A) and the component (B) is from 100/1 to 1/100 by weight.

* * * * *